US008855275B2

(12) United States Patent
Cosky

(10) Patent No.: US 8,855,275 B2
(45) Date of Patent: Oct. 7, 2014

(54) SYSTEM AND METHOD FOR REGULATING OVERLAPPING MEDIA MESSAGES

(75) Inventor: Eric Harvard Cosky, Encinitas, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 1589 days.

(21) Appl. No.: 11/582,698

(22) Filed: Oct. 18, 2006

(65) Prior Publication Data

US 2008/0095338 A1  Apr. 24, 2008

(51) Int. Cl.
| | |
|---|---|
| *H04M 11/00* | (2006.01) |
| *G07F 17/32* | (2006.01) |
| *A63F 13/30* | (2014.01) |
| *H04L 29/06* | (2006.01) |
| *H04L 12/18* | (2006.01) |

(52) U.S. Cl.
CPC ..... *H04L 29/06027* (2013.01); *A63F 2300/572* (2013.01); *G07F 17/32* (2013.01); *A63F 13/12* (2013.01); *G07F 17/3276* (2013.01); *H04L 65/4061* (2013.01); *A63F 2300/1081* (2013.01); *A63F 2300/558* (2013.01); *H04L 65/605* (2013.01); *H04L 65/602* (2013.01); *H04L 12/1881* (2013.01); *H04L 12/1827* (2013.01); *H04L 65/4038* (2013.01); *H04L 67/38* (2013.01)
USPC .................................. 379/88.22; 379/114.11

(58) Field of Classification Search
USPC ........... 455/3.06, 500–527; 379/88.22–88.25, 379/202.01
See application file for complete search history.

(56) References Cited

U.S. PATENT DOCUMENTS

| | | | | |
|---|---|---|---|---|
| 4,580,012 | A | * | 4/1986 | Matthews et al. ............. 379/245 |
| 4,839,857 | A | * | 6/1989 | Mersiovsky et al. ....... 369/25.01 |
| 5,136,634 | A | * | 8/1992 | Rae et al. ................. 379/100.11 |
| 5,511,000 | A | * | 4/1996 | Kaloi et al. .................... 704/201 |
| 5,781,615 | A | * | 7/1998 | Bales et al. ................ 379/88.18 |
| 5,802,466 | A | * | 9/1998 | Gallant et al. ................ 455/413 |
| 5,860,023 | A | | 1/1999 | Tognazzini |
| 6,049,765 | A | * | 4/2000 | Iyengar et al. ................ 704/201 |
| 6,185,525 | B1 | * | 2/2001 | Taubenheim et al. ......... 704/211 |
| 6,335,962 | B1 | * | 1/2002 | Ali et al. ..................... 379/88.11 |
| 6,693,515 | B2 | * | 2/2004 | Clapper ..................... 340/384.7 |
| 6,741,680 | B2 | * | 5/2004 | Bates et al. ................ 379/88.22 |
| 7,136,462 | B2 | * | 11/2006 | Pelaez et al. ............... 379/88.14 |
| 7,171,367 | B2 | * | 1/2007 | Chang ........................... 704/503 |
| 7,292,564 | B2 | * | 11/2007 | Ekstrom et al. ............... 370/350 |
| 7,310,412 | B1 | * | 12/2007 | Tuttle .............................. 379/70 |

(Continued)

FOREIGN PATENT DOCUMENTS

| | | |
|---|---|---|
| DE | 10 2004 049907 A1 | 4/2006 |
| JP | 08-088692 | 4/1996 |
| JP | 08-2748888 | 10/1996 |
| JP | 2006-060364 | 3/2006 |

*Primary Examiner* — Duc Nguyen
*Assistant Examiner* — Assad Mohammed
(74) *Attorney, Agent, or Firm* — Mark D. Wieczorek; Mayer & Williams PC

(57) ABSTRACT

The described systems regulate the transmission and playback of multiple streams of audio data, e.g., for a multiplayer game, and provide sequential playback of audio, buffered while the listener is listening to a different stream, time-compressed if necessary. The systems thus solve a problem of users "talking over each other" by: (1) regulating access to audio channels; and (2) treating the spoken audio as distinct blocks so as to play the messages, e.g., from multiple channels, sequentially to users. The messages may be played back at a later time at time-compressed rates or aborted as directed by the user or by a separate automated process.

16 Claims, 12 Drawing Sheets

(56) References Cited

U.S. PATENT DOCUMENTS

| | | | |
|---|---|---|---|
| 7,324,802 B2 * | 1/2008 | Jennings | 455/404.1 |
| 7,330,541 B1 * | 2/2008 | Surazski et al. | 379/202.01 |
| 7,590,699 B2 * | 9/2009 | Natarajan et al. | 709/206 |
| 7,647,383 B1 * | 1/2010 | Boswell et al. | 709/207 |
| 7,756,036 B2 * | 7/2010 | Druke et al. | 370/235 |
| 7,886,006 B1 * | 2/2011 | Freestone et al. | 709/206 |
| 7,995,721 B2 * | 8/2011 | Gallick et al. | 379/90.01 |
| 8,249,568 B2 * | 8/2012 | Salmon | 455/414.4 |
| 8,379,594 B2 * | 2/2013 | Jo et al. | 370/331 |
| 2003/0066073 A1 | 4/2003 | Rebh | |
| 2003/0152093 A1 | 8/2003 | Gupta et al. | 370/412 |
| 2003/0177187 A1 * | 9/2003 | Levine et al. | 709/205 |
| 2004/0102186 A1 | 5/2004 | Odinak | |
| 2004/0127284 A1 * | 7/2004 | Walker et al. | 463/30 |
| 2004/0190700 A1 * | 9/2004 | Cutaia et al. | 379/202.01 |
| 2004/0267952 A1 * | 12/2004 | He et al. | 709/231 |
| 2005/0069095 A1 * | 3/2005 | Fellenstein et al. | 379/88.02 |
| 2005/0271194 A1 | 12/2005 | Woods et al. | 379/202.01 |
| 2006/0046758 A1 * | 3/2006 | Emami-Nouri et al. | 455/518 |
| 2006/0050743 A1 | 3/2006 | Black et al. | 370/516 |
| 2006/0160522 A1 | 7/2006 | Jennings | |
| 2007/0180042 A1 * | 8/2007 | Benco et al. | 709/207 |

* cited by examiner

SYSTEM AND METHOD FOR REGULATING OVERLAPPING MEDIA MESSAGES

BACKGROUND

Standard multiuser voice-over-IP ("VOIP") systems, such as are employed in massive multiplayer online games ("MMOs"), suffer drawbacks when two or more users or players are talking at the same time on the same channel. Even if users attempt to avoid such "talking over each other", the inherent latency in transmission and playback defeats such attempts. The problem is accentuated in multichannel systems as speakers listening to and transmitting in different channels may unknowingly talk over each other as heard by a listener who is listening to both channels simultaneously.

As an example, and referring to FIG. 1, a system 10 is shown in which a game server 12 services a number of game clients 14, 16, 18. The game server 12 runs the game engine application, maintains the overall game virtual environment, and sends information to the game clients pertinent to the player characters and environment local to the client.

The game clients may send messages to each other, which may include text or audio. FIG. 2 illustrates a prior art media message, in particular an audio message 22, which has some extent over time as measured by time axis 20. If multiple messages arrive and are played back simultaneously, or even partially overlap, a listener will deleteriously and confusingly hear the two messages played back at the same time, at least during the overlap. For example, FIG. 3 illustrates multiple media messages, i.e., audio messages 22, 24, and 26 which partially overlap. The messages are all shown as being within a single channel X. At point 28, a listener of channel X would just hear the audio message 22. At time 32, the listener of channel X would hear the audio messages 22 and 24 overlap. And at time 34, the listener of channel X would hear the audio messages 22, 24, and 26 simultaneously play. Hearing three messages at once is typically very confusing for a listener. FIG. 4 illustrates a situation similar to that of FIG. 3, but where multiple channels are present. In this case, for example, messages 36 and 38 do not overlap within their channel X, but message 36 overlaps with messages 42 and 44 from channel Y, and message 38 of channel X overlaps with message 44 from channel Y.

SUMMARY

The described systems regulate the transmission and playback of multiple streams of audio data, e.g., in a VOIP system for a multiplayer game. The systems also provide sequential playback of audio, which may be buffered if the listener is listening to one stream while the next arrives. The audio may also be time-compressed. The systems thus solve a problem of users ("speakers") "talking over each other" by: (1) regulating access to audio channels; and (2) treating the spoken audio as distinct blocks ("messages") so as to play the messages, e.g., from multiple channels or multiple users in a single channel, sequentially to users ("listeners"). In general, a goal is to have the listener hear speakers' messages in as close to real-time as possible, i.e., at a time as close as possible to the time the speaker transmitted the message.

In an MMO embodiment, exemplary channels may include a Raid Channel, a Guild Channel, a Group Channel, etc. The messages may be played back at a later time at high compression rates or aborted as directed by the user or by a separate automated process.

In more detail, the first major aspect is a recording queue mechanism for a given channel, which regulates access to the channel. Generally speakers are only able to access the channel via a queue system. Speakers may also be given access via a priority system, with higher priority speakers given more rapid access and control of the channel. In another embodiment, a request for access may be broadcast to the speaker or to all users so that a given speaker may relinquish the channel to the requested speaker if desired. A channel may also be configured to work in an unregulated or partially regulated manner, where audio from speakers that are currently granted transmission rights is mixed into a common stream that will be mixed into a single stream for purposes of identifying message blocks to the playback system.

The second major aspect is a playback queue mechanism for messages, which may arise from multiple speakers in one channel or from one or more speakers on multiple channels. In general, the listener may hear the messages according to the recording queue, or may define a queue according to their own preferences. In the case of multiple channels, a default channel order may be prescribed for playback or the listener can define their own. In any case, the playback may be time-compressed—in this way, the messages may be heard soon after they are spoken, and the listener may choose to hear more messages than would be possible in non-time-compressed playback. Playback may occur of a message in real-time while, e.g., other messages are accumulating. Once the playback is complete, the accumulated messages may automatically playback at a time-compressed rate until the compressed message playback "catches up" to a real-time playback. The listener may switch between channels, e.g., if a message is detected on a high-priority channel. In this way, the listener may switch to the higher-priority channel and allow messages on lower-priority channels to accumulate, to be played back later at time-compressed rates if necessary.

Audio or other feedback may be prefixed to messages to provide information about the speaker, the channel the speaker is recording to, etc. Similar systems can also be applied to video applications or other applications that require dynamically prioritized sequential review of data arriving from disparate sources.

In one aspect, the invention is directed to a method of regulating the transmission of messages in a multiuser system. The method includes steps of receiving requests to transmit a message from at least two speakers of the multiuser system; queuing the requests according to a priority system; and when a request is at a top of the queue, allowing the corresponding speaker to transmit a message. In another aspect, the invention is directed to a computer readable medium containing instructions for causing a computer to implement this method.

Implementations of the invention may include one or more of the following. A further step may be to notify the corresponding user that the same is allowed to transmit a message via an indication on a user interface. The requests to transmit may be generated by a keyboard entry or other speaker initiated event. Each speaker may have an associated priority, and requests to transmit may be disposed in the queue at least in part based on their corresponding speaker's priority. One of the priority levels may be a leader or moderator level, and messages from speakers having the leader or moderator level may be placed at the top of the queue. A request to transmit from a speaker at a non-leader level may be elevated to the top of the queue based on an input from a speaker at the leader level. The system may be a massive multiplayer game, a videoconferencing system, etc. A speaker may send a request to transmit in any of a plurality of channels, where each channel is associated with a key on a keyboard. An accompanying message may be added to at least one of the messages, either inserted before the beginning of the message or added after the end of the message. The content of the accompanying message may be chosen by a speaker, a listener, or provided by an application, and may be indicative of the identity of a speaker. The accompanying message may include a visual cue on a user interface or an audio cue. In the case where the system is a videoconferencing system, requests to transmit may be generated by a motion or voice detection system. In the case where the system is a massive multiplayer game, requests to transmit may be generated by a voice detection system. Requests to transmit may be displayed to other users on the system via a user interface. The multiuser system may include at least two channels, where each channel has a corresponding queue.

In a further aspect, the invention is directed to a method of regulating the transmission of messages in a multiuser system, including steps of receiving requests to transmit a message from at least two users of the multiuser system, and queuing the requests based at least in part on a status of the system. In one implementation, the system may be a massive multiplayer game, and the status may relate to: a quest, regular gameplay, trade skills, or number of overlapping messages.

In yet another aspect, the invention is directed to a method of regulating the playback of messages generated by a plurality of speakers in a multispeaker environment. Steps of the method include receiving at least two messages, the two messages at least partially overlapping with respect to time, and playing back at least two messages sequentially. In another aspect, the invention is directed to a computer readable medium containing instructions for causing a computer to implement this method.

Implementation of the method may include one or more of the following. Playback may occur while at least another message is being received, or while a plurality of messages are accumulating, the accumulating messages being stored. An order of the sequential playback may be determined by a user. During the time a first message is playing back, a user input may be received to stop the playing back of the first message, in which case a second message is played back, the second message sequentially following the first message. The second message may be played back at a time-compressed rate. The first message may be discarded or played back at a later time. The user input may be a keyboard entry or other feedback mechanism or other user-initiated event. An order of the sequential playback may be determined by which message was received first. Each message may have a corresponding beginning and ending time stamp, and an order of the sequential playback may be determined by which message has the earlier beginning time stamp or by which message has the earlier ending time stamp. An order of the sequential playback may also be determined by a priority system. The messages may be received from one or more channels, each channel having an associated priority level, and the priority system may be such that messages from higher priority channels are played back before messages from lower priority channels. Messages may be received from one or more channels, each channel having an associated priority level, and further steps may include: during the time a first message from a first channel is playing back, a user input may be received to stop the playing back of the first message, in which case the second message is played back, and the first message is assigned to a channel having a priority level lower than the first channel. In this case, the first message may then be played back, either from the beginning or from a point at which its playback was previously stopped. Messages received from lower priority channels may be played back at a time-compressed rate. Each speaker of the plurality may have an an associated priority level, and the priority system may be such that messages from higher priority speakers are played back before messages from lower priority speakers. Messages received from lower priority speakers may be played back at a time-compressed rate. Messages may include audio data or video data, and may pertain to massive multiplayer games, videoconferencing systems, voice-over-IP applications, etc. At least one of the messages may be time-compressed, e.g., such that its pitch is maintained. This may be achieved by removing silences of greater than a prespecified length in the messages. In this case, the removed silences may be indicated by an audio cue or a video cue in a user interface. Alternatively, the time-compression may be achieved by removing a subset of messages that occur within a time frame that is defined by having a high concentration of overlapping messages. The level of time-compression may be adjustable by the user. A first message to be played back sequentially may be played back at a normal rate, and a second message to be played back sequentially may be played back at a time-compressed rate. Alternatively, both messages may be time-compressed. The second and any subsequently-received messages may be played back at time-compressed rates until such time as the playback is occurring in near real time. The level of time compression may be directly related to a cumulative file size of the messages that have been received but have not yet been played back. An accompanying message may be added to at least one of the messages prior to the playing back; the accompanying message may be inserted before the beginning of the message or added after the end of the message, and the content may be chosen by a speaker, a listener, or automatically by an application. The content of the accompanying message may be indicative of the identity of a speaker. At least two messages may be from a single channel or from at least two of a plurality of different channels. The method may be implemented on a server running a multi-user application. At least one of the messages may be converted to text. The messages may be received from one or more channels or speakers, each channel or speaker having an associated priority level, and the priority system may be such that a higher priority message is played back and a lower priority message is converted to text.

DETAILED DESCRIPTION

Figure 1:
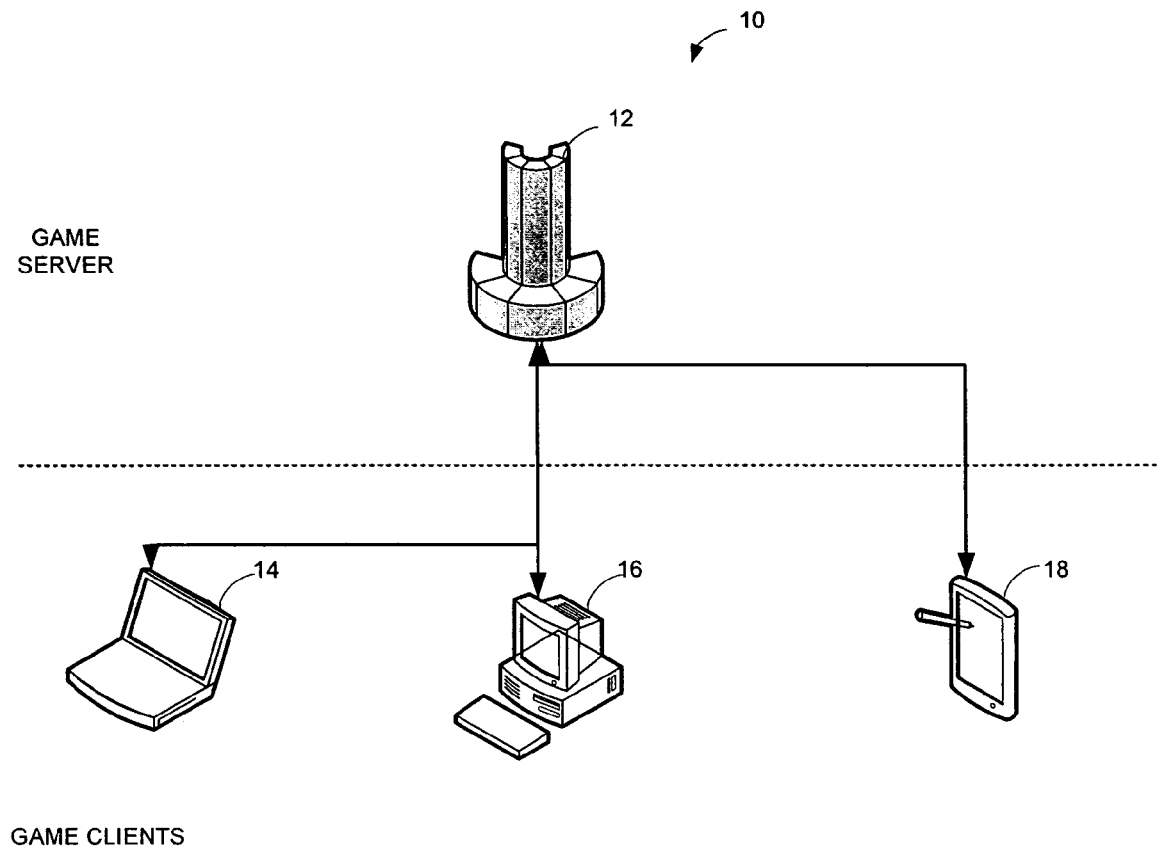
FIG. 1 illustrates a prior art game server/game client system.
Figure 2:
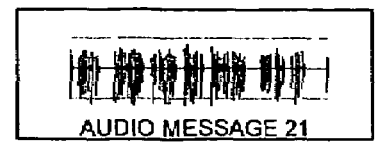
FIG. 2 illustrates a prior art media message, here shown as an audio message.
Figure 3:
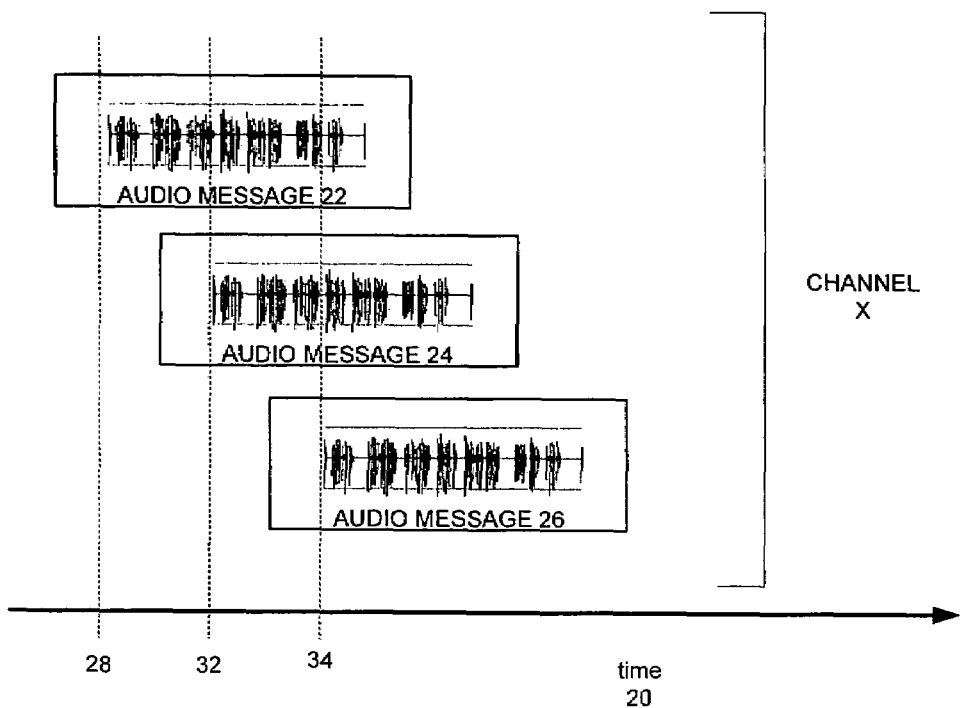
FIG. 3 illustrates a set of prior art media messages, all of the messages being in one channel and partially overlapping in time.
Figure 4:
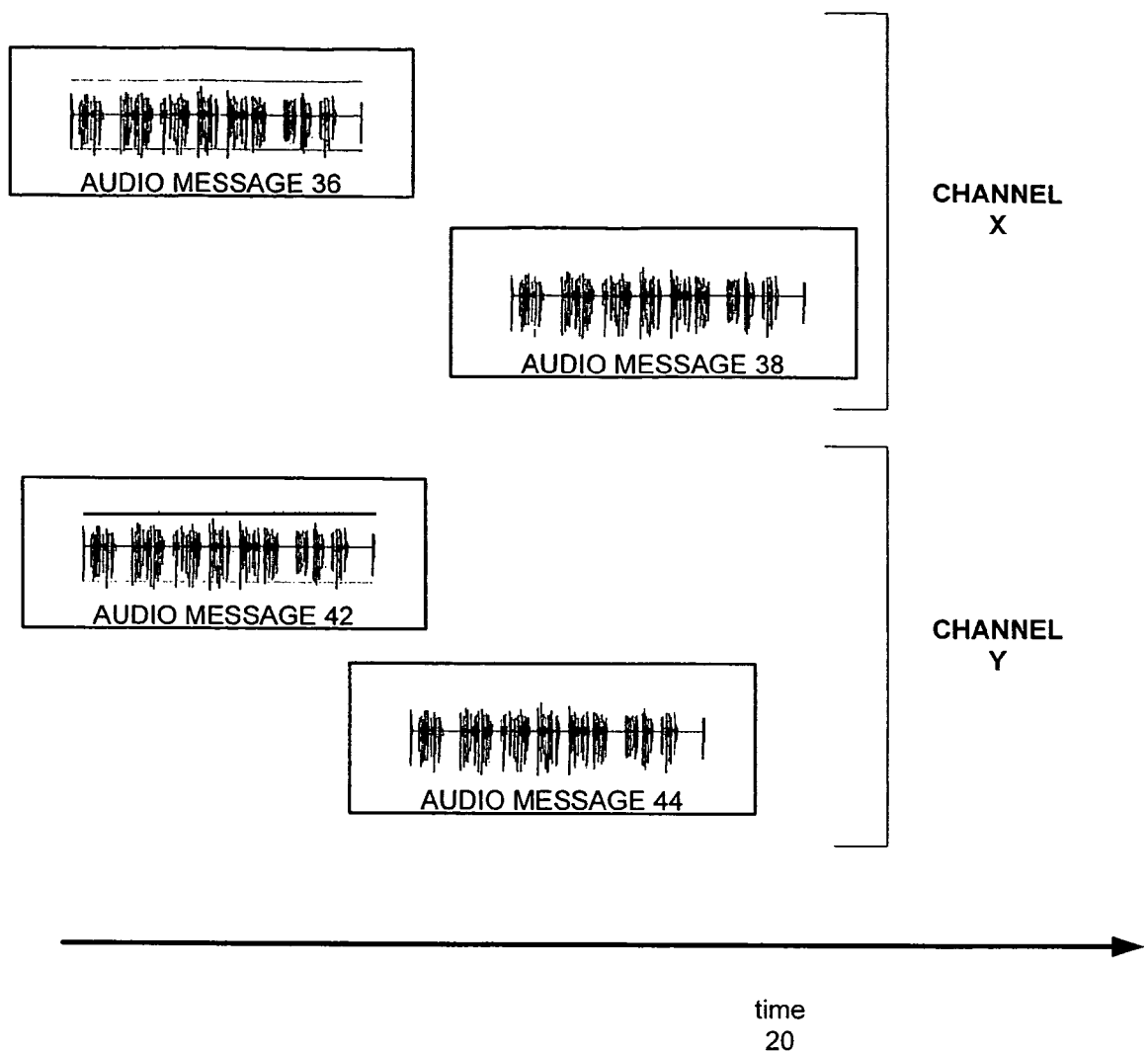
FIG. 4 illustrates a set of prior art media messages, the messages being in different channels and partially overlapping in time.

The following definitions are employed in this description of a system and method for regulating overlapping media messages.

A "speaker" is a person who provides the content of a media message. Similarly, a "listener" is a person who is provided the content of a media message. A listener need not actually listen to the media message—the same may choose to skip the playback or may even automatically filter the message such that the same is skipped, deleted, played back at a later time, played back at a certain playback rate, is made the subject of a text transcription, etc.

A "message" or "media message" is a distinct block of content that has some extent in time. A media message is generally provided by a speaker, although the same may also be provided automatically by a machine, e.g., by a non-player character. In many cases, a message will be created by a speaker pressing a key on their computer, speaking, and then releasing the key. This package of data represents a limited number of seconds of audio which is not split or mixed with other audio. Such a message may be sent to a server, streamed to reduce latency if desired, and then distributed to clients. The system may also operate in a peer-to-peer architecture. In this description, audio messages are discussed but it should be clear the invention may apply to any type of content.

An "accompanying message" describes content that is added to a message, and often gives information about the source of a message. An accompanying message may be provided by a speaker, a listener, or automatically by an application. Accompanying messages may provide other types of information as well.

A "prefix" is a type of accompanying message, and is inserted before the beginning of a media message. A "suffix" is a type of accompanying message, and is added after the end of a media message, which may give similar information as a prefix.

A "cue message" is a type of message provided to a speaker after they have been notified that they may transmit a message. For example, a cue message may be employed to notify the speaker of the name of the channel in which they are about to transmit. Typically, cue messages are provided by the system but they may be modified or customized by the speaker or user.

"Real time" is used to describe communications where a listener hears the words a speaker speaks as soon as they are spoken. Typically, due to latencies in transmission, a listener hears the words a speaker speaks, at best, soon after they are spoken, in which case playback is said to occur in "near real time" or "close to real time" or using similar phrases.

"Sequentially" is used to mean that messages are played one after the other, i.e., in a non-overlapping manner. However, sequential messages may also be spaced relative to one another, e.g., there may be inserted a period of silence or other content between playback of sequential messages.

In most embodiments of the invention, a message is said to be "transmitted" when the beginning of the message begins to stream from the speaker's client to the server. In the same way, a message is said to be "received" when the beginning of the message begins to arrive to the listener's client from the server. In some embodiments, these terms may apply to when an entire message is transmitted or received, rather than just the beginning; this embodiment may in many cases be equivalent to reception of the end of the message. However, to achieve as close to real time communications as possible, a streaming technology may be used. In this case, the terms applies to receipt of the beginning of the message.

Figure 5:
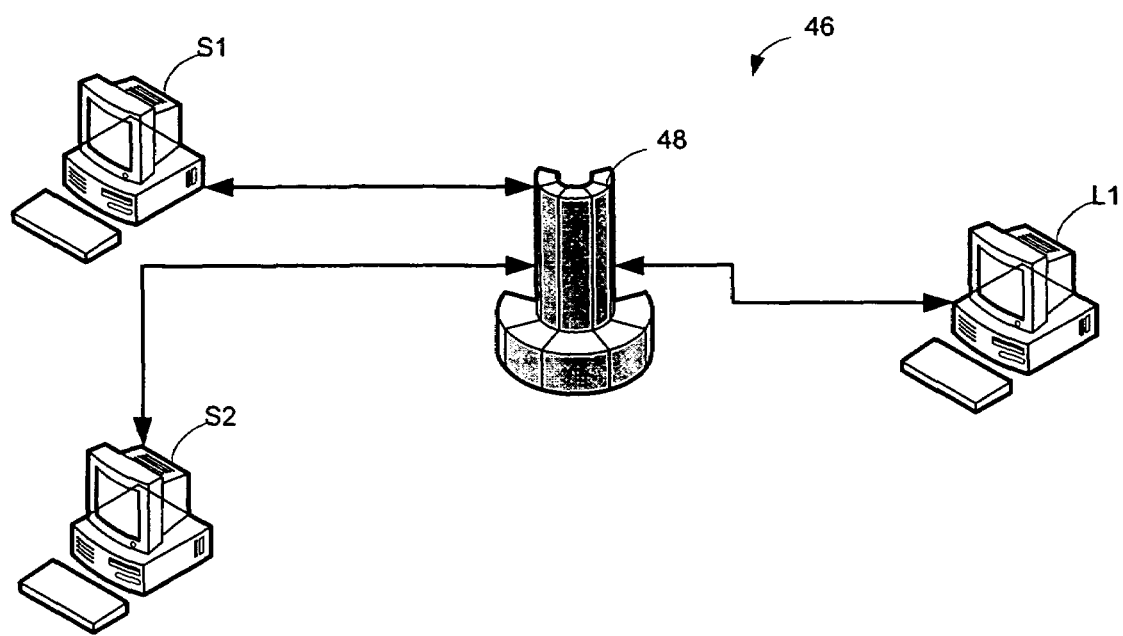
FIG. 5 illustrates a game server/game client system that may implement the methods of the invention.

FIG. 5 illustrates a system 46 that may embody certain methods of the invention. A server 48 is shown in communication with client computers S1, S2, and L1. For purposes of this description, S1 and S2 denote speaker clients and L1 denotes a listener client. Of course, at any given time, the roles may be switched or otherwise combined.

Figure 6:
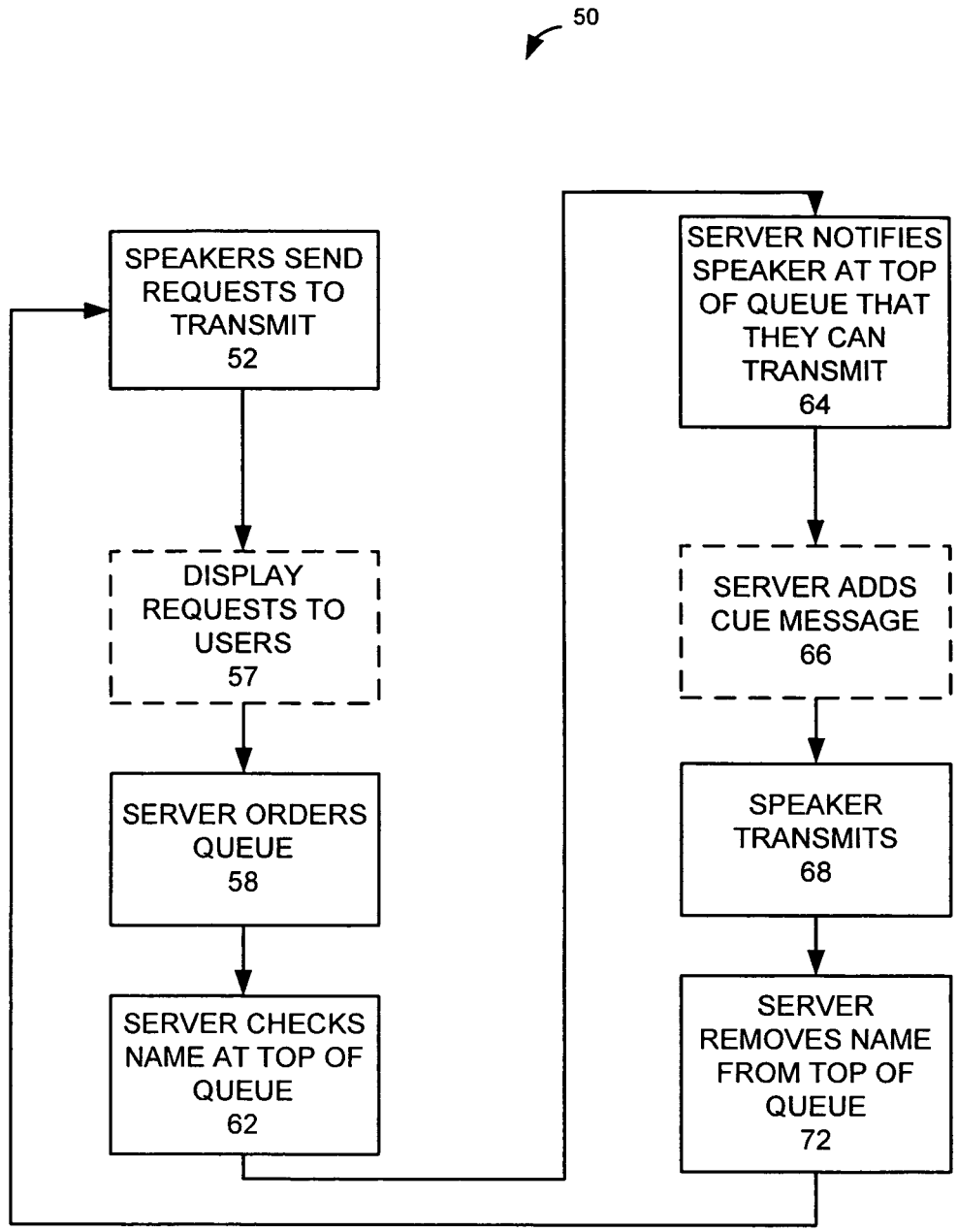
FIG. 6 illustrates a method according to a first embodiment of the invention.

Referring to FIG. 6, a flowchart illustrates a method 50 which may implement a first embodiment of the invention. This method provides a way to regulate access by speakers to a channel. Generally speakers access channels via a queue system, although this method may be enhanced by giving speakers access via a priority system, with higher priority speakers given more rapid access and control of the channel. Details of these techniques are provided below.

First, a speaker S1 sends a Request to Transmit ("RTT") to the server (step 52). The RTT may be made by way of a mouse click, keyboard entry, or other such mechanism. The RTT may then be displayed to the all users of the channel (step 57) so that other users, especially current speakers, may relinquish the channel if desired. The RTT may also be displayed just to a subset of channel users, such as to those who currently have access to speak.

The server then orders and/or updates the queue (step 58) according to a set of rules currently in place, described in more detail below. The server checks the name at the top of the queue (step 62), and notifies the corresponding speaker that they have been granted access to the channel. At this time, or alternatively after the speaker has keyed a TRANSMIT button, a cue may be provided (step 66). Such a cue may be in audio or video form via an appropriate UI, and may, e.g., notify the speaker of the name of the channel into which they are about to transmit. Following the start of transmission by the speaker (step 68), the server removes the name from the top of the queue (step 72), and the process repeats.

Figure 7:
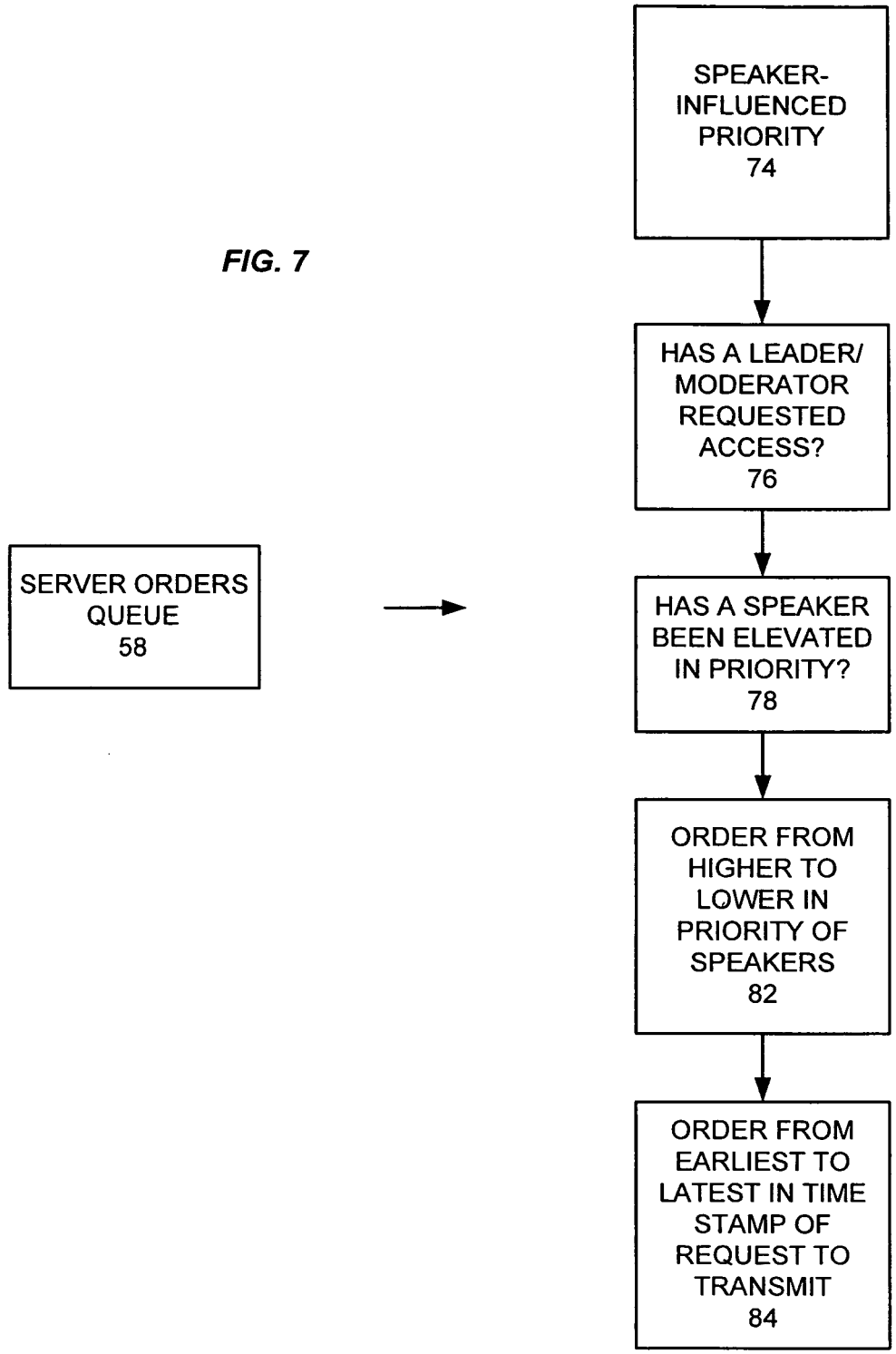
FIG. 7 illustrates further details of the method of FIG. 6.

FIG. 7 shows more details of the step of ordering the queue (step 58). It should be noted that the steps described in this figure may be performed in any order, and not all need be performed in any given embodiment of the method.

One way of ordering the queue is to include consideration of priority as chosen by the speaker (step 74). Speakers in a channel may denote certain messages sent to that channel as having a higher priority than other messages. For example, in MMO role-playing games, an "enemy approaching" message may take channel priority over a general conversation message. One way of accomplishing this is to have different keys which may be used by the speaker to influence the priority of the message. By striking a key before, during, or after transmission, the player may influence the priority of the message. In this way, players could potentially interrupt conversations in a channel when significant events occur.

Another way to order the queue of RTTs is to arrange the queue according to priority of speaker (step 82), e.g., by level or by another priority scheme. In this way, higher-priority speakers may receive easier access to the channel. A special case of this method is to immediately place, at the top of the queue, RTTs from leaders in the channel, channel moderators, or other such speakers to whom such access is appropriate (step 76). Correspondingly, such individuals may grant such access privileges to lower-priority speakers (step 78), e.g., for a limited time.

More generally, an "allowed speakers" list may be employed, with speakers on this list always given priority, and crosstalk may be allowed for such speakers or the same may have their messages queued per the methods disclosed.

Conversely, if an RTT is from a perceived source of spam, the same may be summarily deleted or given a low priority.

Yet a further way to order the queue of RTTs is simply by the time of the request (step 84). As each RTT is received at the server, it is time-stamped, and the time-stamp is used to order the messages in the queue. In many cases, this step may entirely replace other steps, though for certain purposes the combination of various steps is particularly convenient.

The status of the system may automatically be employed to influence the queue. For example, in a multiplayer game embodiment, if a high number of RTTs are received at one time, it may be presumed that a high level of action is occurring and the method may automatically refuse to accept certain RTTs, this refusal according to predetermined criteria, e.g., the system may refuse RTTs from players below a certain priority level.

The above description may also be applied to a multi-channel system. Speakers may then transmit messages in one or more channels, using input keys bound to each channel. Each channel may have a separate key, either on a keyboard or a virtual key or button on a UI, such that depression of the key sends an RTT corresponding to the key's channel.

Figure 8:
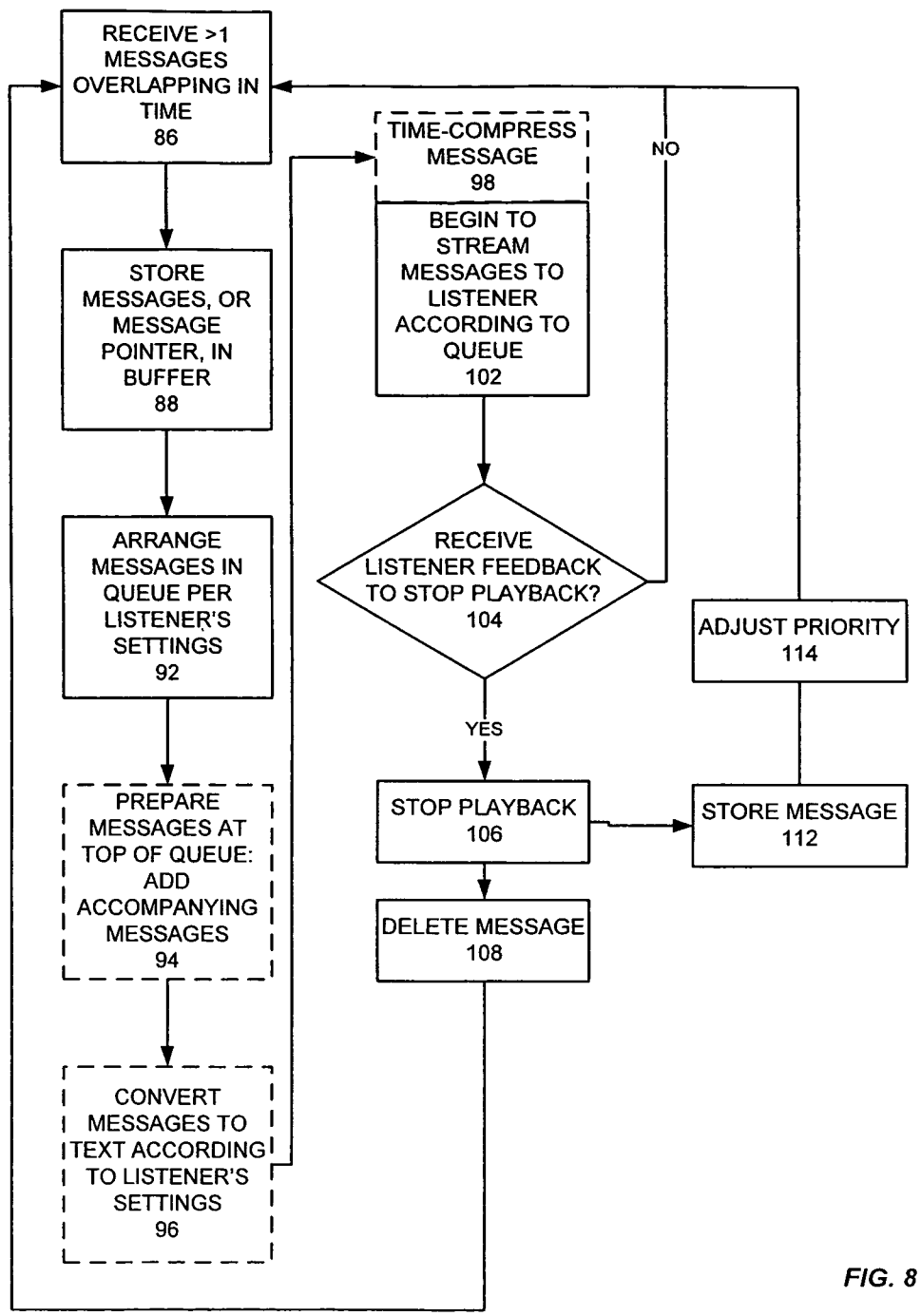
FIG. 8 illustrates a method according to a second embodiment of the invention.

Referring to FIG. 8, a flowchart is shown illustrating a method according to a second embodiment of the invention. This embodiment includes a playback queue mechanism for multiple overlapping messages, either from multiple speakers in one channel or from one or more speakers on multiple channels. This system may be used in combination with the method of FIG. 6, but it need not be. That is, the system of FIG. 8 may be employed entirely on its own.

The first step of the method is the receipt of more than one overlapping message (step 86). These messages may be stored in memory, a buffer, or another suitable type of storage (step 88). It should be noted that this step does not require that the entire message be stored prior to the completion of the step. If a message is being transferred as streaming media, then a pointer or other indicator of the message may be stored while the remainder of the message is received.

The messages are then arranged in a playback queue according to an arrangement chosen by the listener (step 92). Details of such arrangements are described below.

Messages at the top of the queue may undergo an optional preparation step prior to transmission (step 94). One type of preparation is the addition of an accompanying message. An accompanying message is one that is transmitted just prior to or just subsequent to transmission of the message. In the former case, the accompanying message is termed a "prefix", while in the latter it is termed a "suffix". Accompanying messages may typically be employed to identify a speaker; they may be generated either by the speaker, by the system, or even by the listener. The speaker may have a special identification audio code, e.g., a snippet of music with their name overlaid, or other such identifier. Similarly, the listener may upload a separate customized accompanying message for each player in the listener's group.

In some embodiments, an optional step may be taken to convert audio messages to text (step 96) or to another representation of the data such as a single image or a series of single images for video. This may be particularly suitable for messages of low priority, from low priority speakers or from low priority channels, or messages for which the listener desires a written record. Similarly, certain messages may be stored automatically or at the choice of the listener, to be played back later in a non-sequential manner, e.g., when the user is off-line.

Following this step, the message is optionally time-compressed (step 98) and the same is begun to be streamed according to the order in the queue (step 102), the order being in part arranged by the listener. Details of these steps are provided below with reference to FIGS. 9-11.

In some embodiments, during playback of messages, a user may stop the playback, choosing to ignore the rest of the message (step 104) and instead listen to the next message in the queue (step 104). If the user does not stop playback, as may be the usual case, the NO branch of step 104 is followed and the method repeats from step 86. If the user chooses to skip the message, then the YES branch of step 104 is followed which leads to playback being stopped (step 106). The message may either be deleted (step 108) or it may be stored (step 112) for later playback. In the case where the message is stored, its priority level may be adjusted so that the same is played back at a later time, with lower priority. Playback of such a message may be set by the listener to start at the beginning of the message or to start at the point where the listener stopped the playback.

Figure 9:
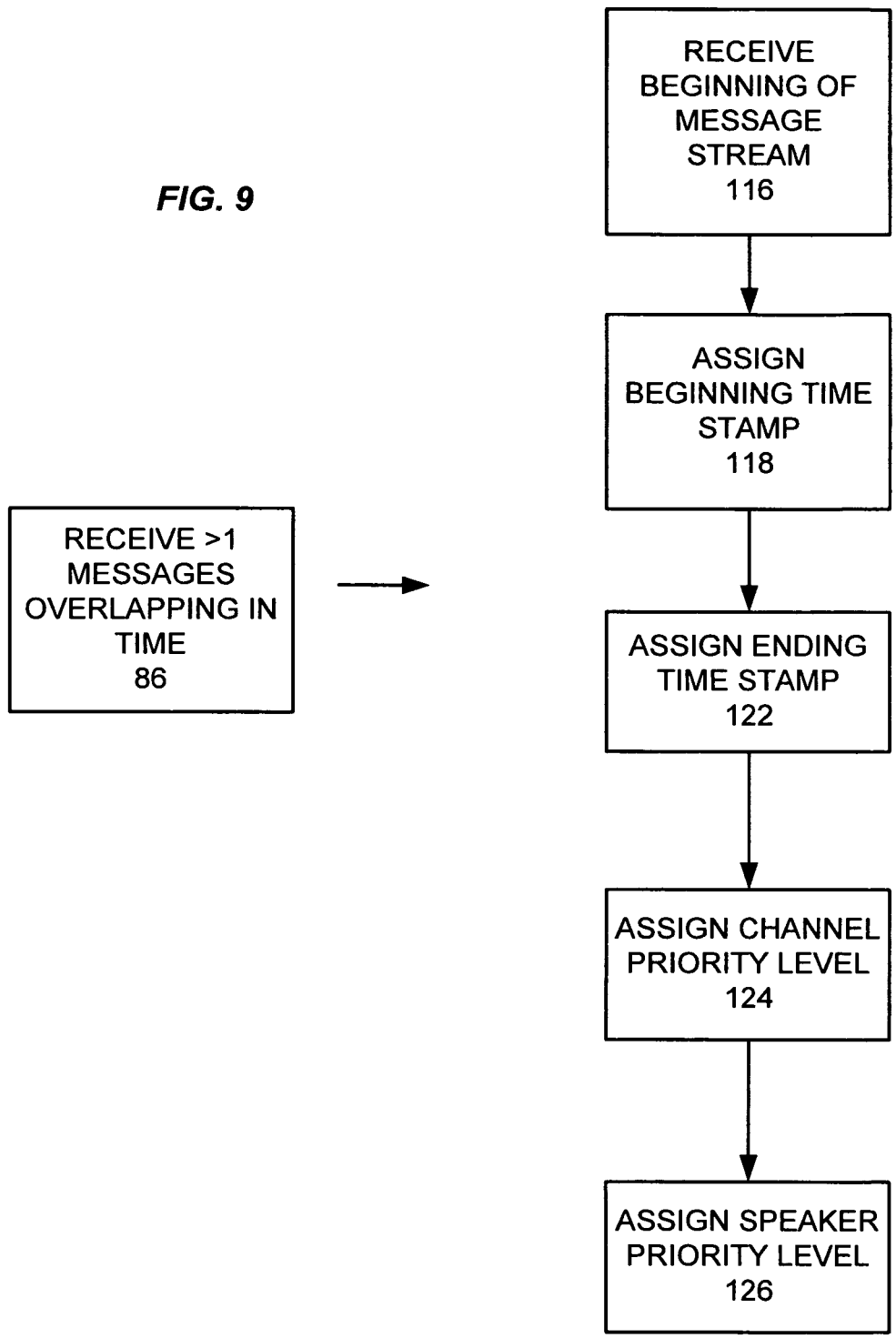
FIG. 9 illustrates further details of the method of FIG. 8.

FIG. 9 describes step 86 is more detail. The Receive Messages step (step 86) begins when the beginning of a message stream begins to be received (step 116). A beginning time stamp is assigned to the message corresponding to the time the beginning of the message was received (step 118). An ending time stamp is assigned to the message corresponding to the time the end of the message was received (step 122), although this step may occur well after any other steps in FIG. 9 are performed. In fact, this optional step may occur well after the message is begun to be transmitted to a listener. The message is assigned a priority level according to its origination channel (step 124) as well as according to the priority level of the speaker (step 126). Step 86 may include any or all of these ordering steps 116-126. For example, in many cases, only one of the time stamp steps 118/122 will be necessary.

Figure 10:
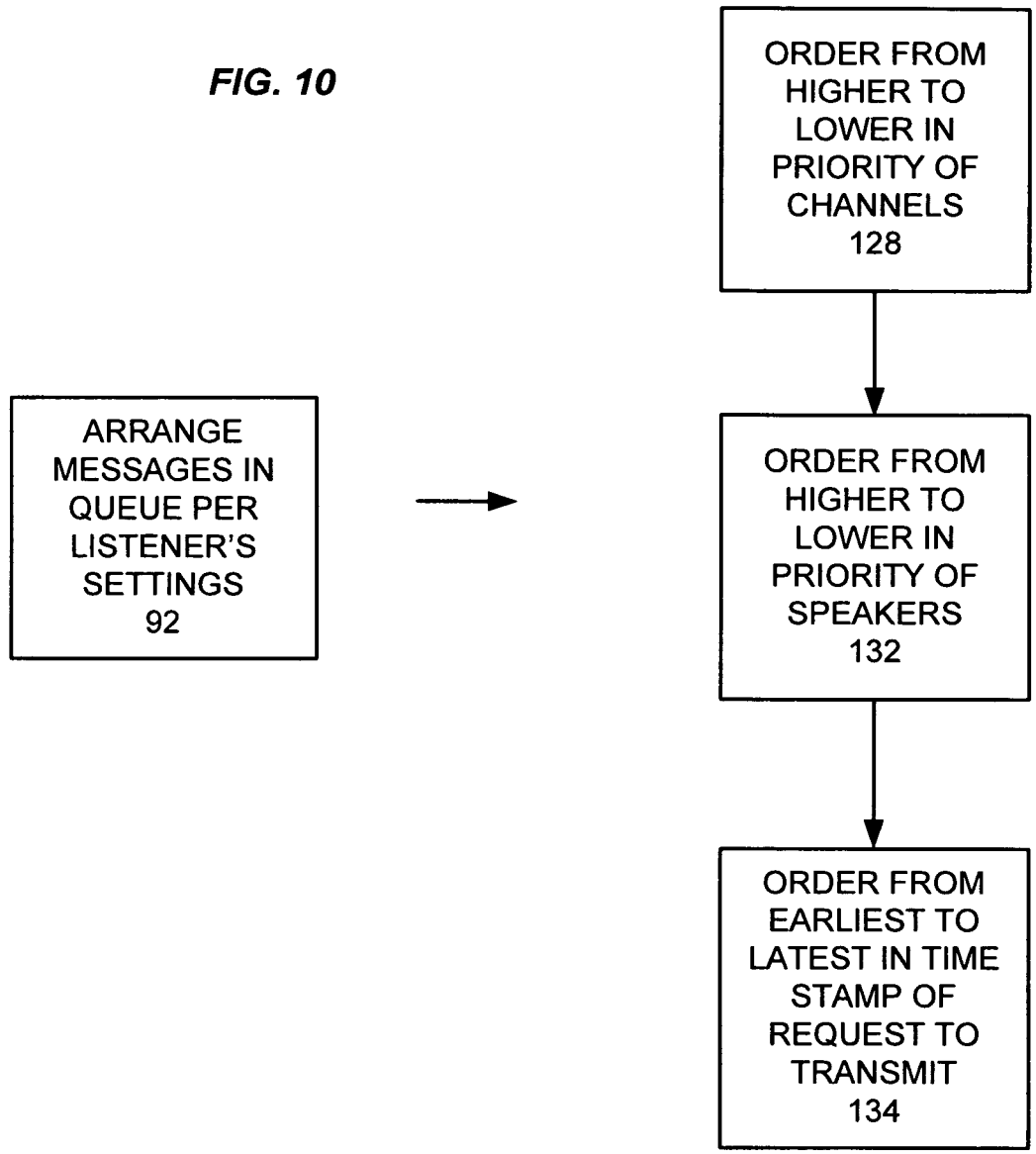
FIG. 10 illustrates still further details of the method of FIG. 8.

FIG. 10 describes step 92 in more detail. The Arrange Messages step (step 92) may begin with ordering overlapping messages in order from highest to lowest in priority of channels (step 128). Following this ordering, for any given channel, overlapping messages may then be ordered from highest to lowest in priority of speakers (step 132). Finally, for any given channel and speaker priority level, messages may be further ordered by their beginning time stamps (step 134); that is, the earliest received at the server may be transmitted first, followed by subsequent messages.

The above describes an exemplary method of ordering, and the same may well be suited as a default arrangement. However, the method may be customizable to allow the listener to arbitrarily arrange the queue.

Figure 11:
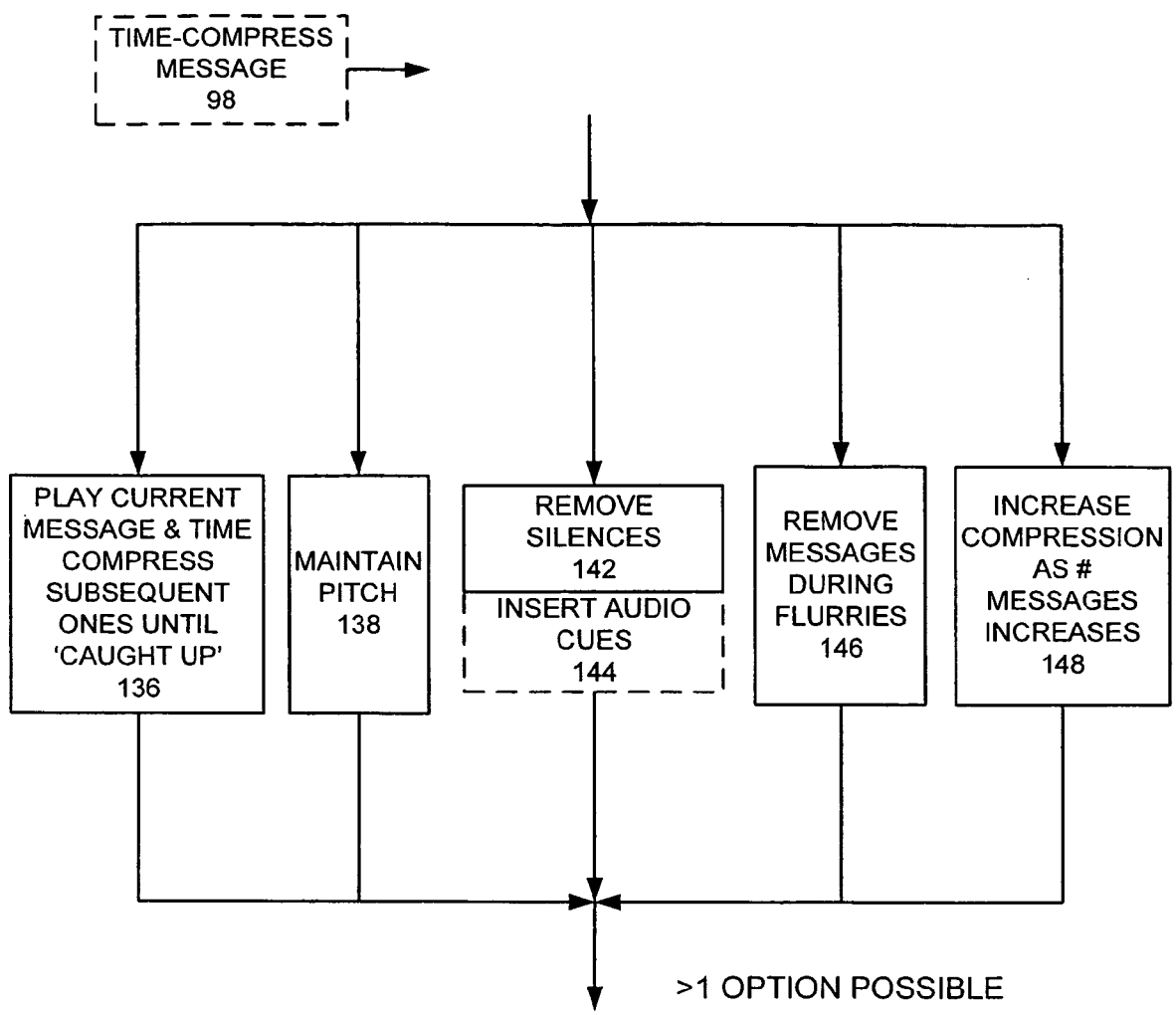
FIG. 11 illustrates even more details of the method of FIG. 8.

FIG. 11 describes step 98 in more detail. Any or all of the played-back messages may be compressed in time so that a greater number of messages may be heard by the listener than in the case with no compression. Moreover, in this way, the played-back messages may be heard sooner after they are spoken than in the case of no compression.

In general, playback may occur of a message in real-time while other messages are accumulating. In one embodiment, once the playback is complete, the accumulated messages may automatically playback at a time-compressed rate until the time-compressed message playback "catches up" to a real-time playback (step 136).

Time-compression techniques are known. In these embodiments, however, certain points may be noted. First, for many listeners, it may be desirable to use a time-compression technique that maintains the pitch of the speaker (step 138); in this way, the compressed message may be rendered more comprehensible. Another way to compress messages is to eliminate silences between words (step 142). A similar technique is to eliminate periodic sections, e.g., every few milliseconds. This has been shown to have a negligible impact on comprehensibility. In any case, an optional audio cue or other feedback mechanism may be employed to notify the listener that compression is occurring (step 144).

Another technique that may be employed to allow listeners to hear comprehend as many important messages as possible is to eliminate a certain number of messages that occur during flurries (step 146). In particular, in many situations, especially those involving multiplayer games, a particular event will yield a large number of simultaneous messages. For example, the arrival of an enemy combatant will often yield many warning calls to and from the players in a raid or quest group. The system may sense a large number of simultaneous or near-simultaneous messages and choose to play only those from speakers above a certain priority level or using any other sort of attenuation criterion, including arrangement criteria set or chosen by the listener.

The system may also automatically, or via user choice, increase the level of compression as the number of messages stored increases (step 148). In this way, the time required to return to real-time playback is decreased. However, in many cases, it may be desirable to have the level of compression set to the highest level possible, for playback of all time-compressed messages, that still yields comprehensible audio.

Even while listening to time-compressed messages, the listener may switch between channels, e.g., if a message is detected on a higher priority channel. In this way, the listener may switch to the higher priority channel and allow messages on lower priority channels, or from lower priority speakers, to accumulate, to be played back at time-compressed rates at a later time if desired. Conveniently, a listener may designate a channel as a "Low Priority Chatter" channel, and all such user-truncated messages may be reprioritized or categorized into this channel.

In any case, one or a combination of such compression techniques may be employed to yield any desired amount of compression.

Figure 12:
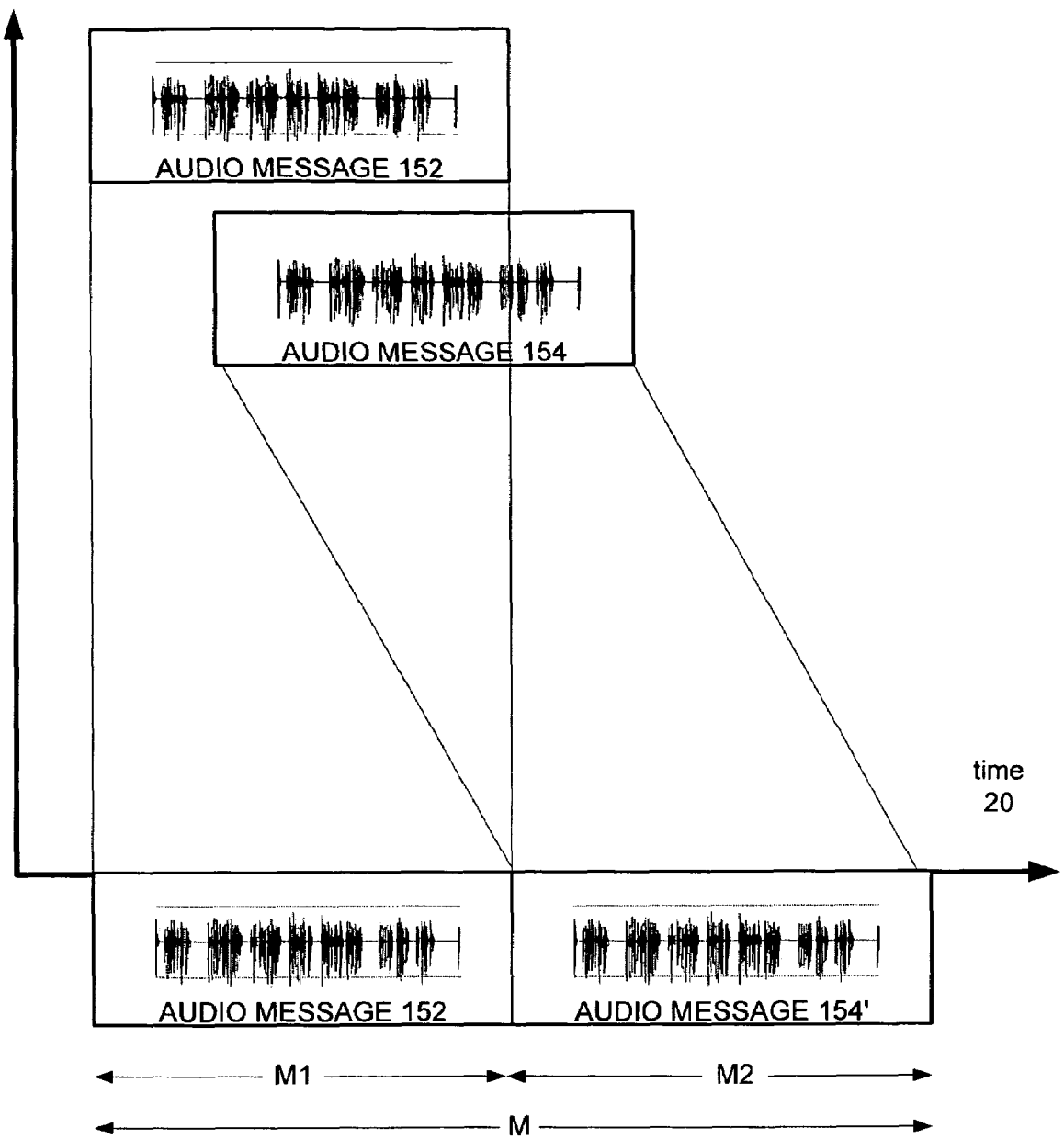
FIG. 12 illustrates the results of an exemplary method according to the second embodiment of the invention.

FIG. 12 illustrates the results of an exemplary method according to the second embodiment of the invention. In this figure, a first message 152 maintains its position on a time axis 20 but a second message 154 is time-shifted, the shifted message denoted message 154', such that the message 154' begins to stream right after the end of the streaming of the first message 152.

Figure 13:
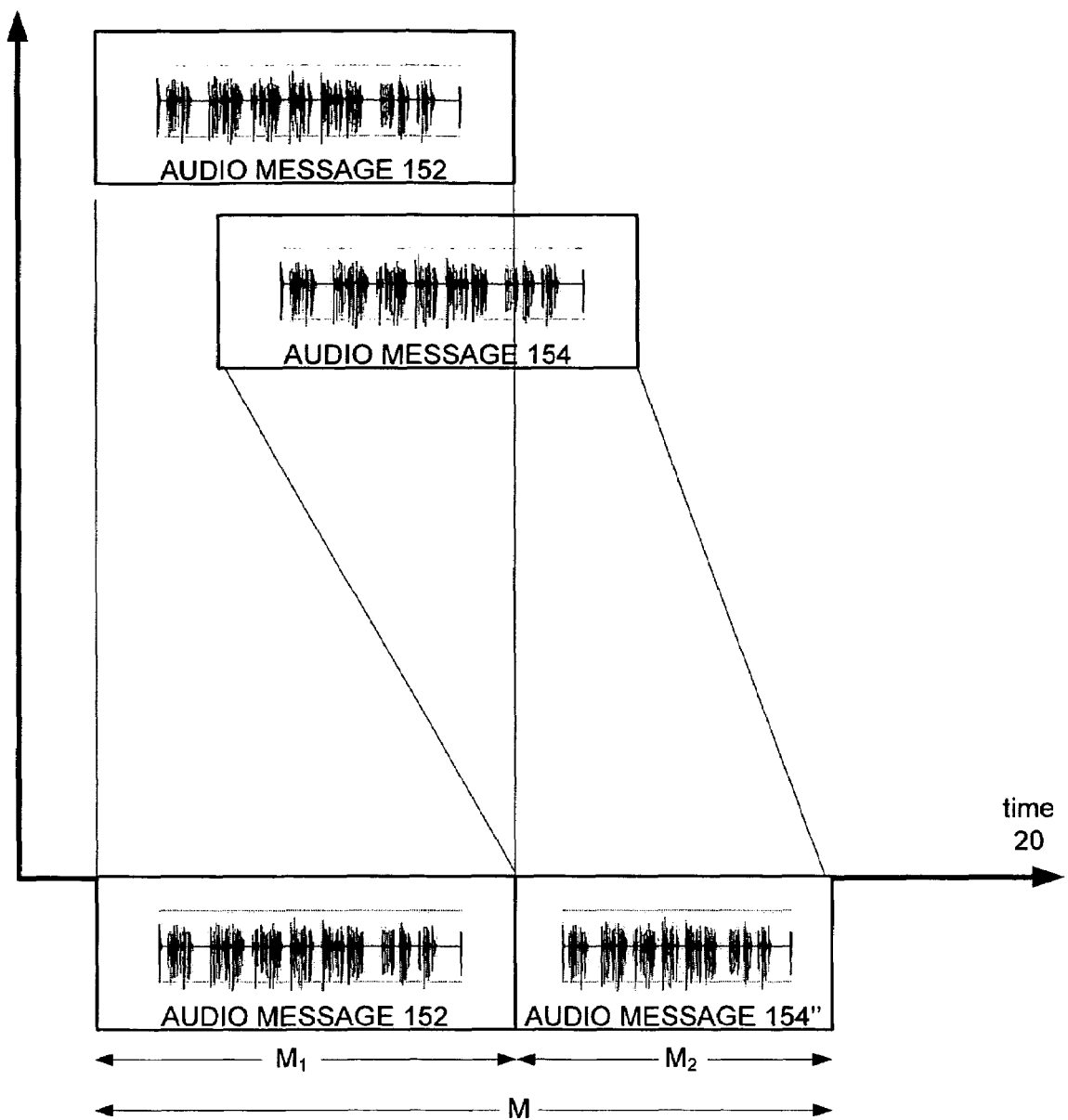
FIG. 13 illustrates the results of another exemplary method according to the second embodiment of the invention.

FIG. 13 illustrates the results of another exemplary method according to the second embodiment of the invention. Here a level of compression is employed, shifting message 154 and compressing the same. The shifted and compressed message is denoted 154".

In FIG. 13, the first message 152 has length $M_1$ and compression $r=r_1=$unity, while the second message 154" has length $M_2$ and compression $r=r_2<1$. Here r is used to denote the ratio of the time a compressed message requires to playback divided by the uncompressed time the message requires to playback.

In the general case, if a listener L listens for a total time $T_{compressed}$, then an embodiment of the invention allows the same to listen to N messages so long as the following relationship holds:

$$\sum_1^N r_i M_i = T_{compressed}$$

As the level of compression rises, more messages may be heard, though the clarity of each individual message may suffer. Uncompressed, the messages would take a time $T_{uncompressed}$ to be heard, where:

$$\sum_1^N M_i = T_{uncompressed}$$

Resulting in $$\Delta T = T_{uncompressed} - T_{compressed} = \sum_1^N M_i(1-r_i)$$

Or as a percentage:

$$\Delta T / T_{uncompressed} = \sum_1^N M_i(1-r_i) / \sum_1^N M_i$$

Which is equivalent to the percentage of extra messages, audio, or speech obtainable per unit time by this embodiment of the method of the invention.

Various other examples could also be formulated given this teaching.

Moreover, while the invention above has been described primarily as acting on the basis of audio messages for multiplayer games, it should be clear that the invention is broader than that. In some cases, the system may apply to videoconference systems and other systems in which overlapping messages may cause confusion and thus ordering is desirable.

According to the present invention, as fully described above, a system is provided to regulate the transmission and playback of multiple streams of data, e.g., for a multiplayer game, and provide sequential playback of messages, buffered while the listener is listening to a different stream, and optionally time-compressed. The systems thus solve a problem of users ("speakers") "talking over each other".

While the invention has been described in the context of gaming, e.g., MMOs, it should be clear to one of ordinary skill in the art, given this teaching, that the invention is much broader than the embodiments shown. In particular, while the system described here pertains to role-playing games, non-role-playing games, or indeed entirely different applications, may also benefit from the invention. For example, the invention may be employed to regulate multiple overlapping messages in videoconferencing and other situations. The invention may be implemented on a game server, or certain aspects, including playback processing, may be relegated to client machines. While the invention is intended in part to reduce overtalk or cross-talk, the same may be allowed to occur in certain embodiments. In particular, "mixed-down" or "partially regulated" channels may be employed to mix together messages from allowed speakers for various purposes. Yet further, the invention need not only be implemented in new applications; rather, the invention may be integrated with previously-coded or legacy applications. The invention may be implemented in any programming language.

Accordingly, the scope of the invention is limited only by the claims appended hereto.

The invention claimed is:

1. A method of regulating the playback of messages generated by a plurality of speakers in a multispeaker environment, comprising:
   a. receiving a plurality of messages in real time over a time period from a plurality of speakers in a multispeaker environment, the plurality of messages at least partially overlapping with respect to time, a priority associated with each message, a speaker responsible for the message, or a channel on which the message was sent;
   b. while at least one of the plurality of messages is being received, receiving in real time a selection from a user indicating that message playback should be according to the priority of the message, the speaker, or the channel;
   c. playing back the plurality of messages sequentially in a playback queue, as controlled by a processor, according to the indicated priority of the message, the speaker, or the channel; and
   d. further comprising playing back at least some of the plurality of messages at a time-compressed rate, wherein the time compression is such that pitch is substantially maintained by removing a subset of messages that occur within a timeframe that is defined by having a high concentration of overlapping messages.

2. The method of claim 1, wherein playback occurs while at least a plurality of messages are being received, the received messages being stored.

3. The method of claim 1, further comprising;
   a. during the time a first message is playing back, receiving a user input to stop the playing back of the first message; and
   b. playing back a second message, the second message sequentially following the stopping of the first message.

4. The method of claim 3, wherein the user input is a keyboard entry or other user feedback mechanism.

5. The method of claim 1, wherein for a set of messages having the selected priority an order of the sequential playback is determined by which message was received first.

6. The method of claim 1, wherein the messages are received from one or more channels, each channel having an associated priority level, and further comprising:
   a. during the time a first message from a first channel is playing back, receiving a user input to stop the playing back of the first message; and
   b. playing back a second message, and
   c. assigning the first message to a channel having a priority level lower than the first channel.

7. The method of claim 1, wherein the plurality of messages are played back at time-compressed rates until such time as the playback is occurring in near real time, at which point playback occurs at a non-time compressed rate.

8. A non-transitory computer readable medium containing instructions for causing a computer to implement the method of claim 1.

9. The method of claim 1, further comprising, in real time, receiving an indication from a user to convert one or more messages of those not having the selected priority in the playback queue to text, converting the indicated messages to text, displaying the text, and deleting the converted messages from the playback queue.

10. The method of claim 1, wherein the receiving an indication of a priority includes receiving the indication from a speaker.

11. The method of claim 1, wherein the receiving an indication of a priority includes receiving the indication from a user.

12. A method of regulating the playback of messages generated by a plurality of speakers in a multispeaker environment, comprising:
   a. receiving a plurality of messages over a time period from a plurality of speakers in a multispeaker environment, the plurality of messages at least partially overlapping with respect to time;
   b. playing back the plurality of messages sequentially in a playback queue, as controlled by a processor, such that
   c. for each of the plurality of messages, playing back a message from a speaker and adding an accompanying message associated with the speaker or with a channel on which the speaker transmits the message, the same accompanying message played back for each message from the speaker; and
   d. wherein the playing back of at least some of the plurality of messages and accompanying messages occurs at a time-compressed rate, wherein the time compression is such that pitch is substantially maintained by removing a subset of messages that occur within a timeframe that is defined by having a high concentration of overlapping messages.

13. The method of claim 12, wherein the plurality of messages are played back at time-compressed rates until such time as the playback is occurring in near real time, at which point playback occurs at a non-time-compressed rate.

14. The method of claim 12, wherein a priority is associated with each message, a speaker responsible for the message, or a channel on which the message was sent, and further comprising detecting a number of messages that are received in the queue over the time period, and if the number is greater than a predetermined threshold, then performing one or more of the following steps:
   i. playing back only the messages having a priority greater than a predetermined threshold, or the messages from speakers having a priority greater than a predetermined threshold, or the messages on channels having a priority greater than a predetermined threshold; or
   ii. mixing together the messages that overlap with respect to time.

15. A method of regulating the playback of messages generated by a plurality of speakers in a multispeaker environment, comprising:
   a. receiving a plurality of messages over a time period from a plurality of speakers in a multispeaker environment, the plurality of messages at least partially overlapping with respect to time, a priority associated with each message, a speaker responsible for the message, or a channel on which the message was sent; and
   b. detecting a number of messages that are received in the queue over the time period, and if the number is greater than a predetermined threshold, then performing one or more of the following steps:
      i. playing back only the messages having a priority greater than a predetermined threshold, or the messages from speakers having a priority greater than a predetermined threshold, or the messages on channels having a priority greater than a predetermined threshold; or
      ii. mixing together the messages that overlap with respect to time;
      iii. wherein the playing back or mixing together the messages includes playing back at least some of the messages at a time-compressed rate, wherein the time compression is such that pitch is substantially maintained by removing a subset of messages that occur within a timeframe that is defined by having a high concentration of overlapping messages.

16. The method of claim 15, wherein the plurality of messages are played back at time-compressed rates until such time as the playback is occurring in near real time, at which point playback occurs at a non-time-compressed rate.

\* \* \* \* \*